US009323974B2

(12) United States Patent
Yoshida

(10) Patent No.: US 9,323,974 B2
(45) Date of Patent: Apr. 26, 2016

(54) FINGERPRINT RIDGE IMAGE SYNTHESIS SYSTEM, FINGERPRINT RIDGE IMAGE SYNTHESIS METHOD, AND PROGRAM THEREOF

(71) Applicant: NEC Solution Innovators, Ltd., Tokyo (JP)

(72) Inventor: Amane Yoshida, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 0 days.

(21) Appl. No.: 14/401,894

(22) PCT Filed: May 16, 2013

(86) PCT No.: PCT/JP2013/063665
§ 371 (c)(1),
(2) Date: Nov. 18, 2014

(87) PCT Pub. No.: WO2013/172413
PCT Pub. Date: Nov. 21, 2013

(65) Prior Publication Data
US 2015/0161432 A1    Jun. 11, 2015

(30) Foreign Application Priority Data

May 18, 2012    (JP) ................................. 2012-114407

(51) Int. Cl.
*G06K 9/00* (2006.01)
*H04N 19/635* (2014.01)
*G06T 7/40* (2006.01)

(52) U.S. Cl.
CPC ............ *G06K 9/00073* (2013.01); *G06T 7/402* (2013.01); *H04N 19/635* (2014.11)

(58) Field of Classification Search
None
See application file for complete search history.

(56) References Cited

FOREIGN PATENT DOCUMENTS

| JP | 7-160869 | | 6/1995 |
|----|----------|---|--------|
| JP | 7160869 | * | 6/1995 |
| JP | 2000-348178 | | 12/2000 |
| JP | 2000348178 A | * | 12/2000 |
| JP | 2004-127062 | | 4/2004 |
| JP | 2004127062 A | * | 4/2004 |

OTHER PUBLICATIONS

International Search Report mailed Jun. 25, 2013 in corresponding PCT International Application.

(Continued)

*Primary Examiner* — Kim Vu
*Assistant Examiner* — Fred Hu
(74) *Attorney, Agent, or Firm* — Finnegan, Henderson, Farabow, Garrett & Dunner LLP

(57) ABSTRACT

A fingerprint ridge image synthesis system, configured to accurately extract the shape of the ridges contained in a fingerprint image and clearly reproduce the fingerprint of the fingerprint image on an image, includes: a ridge pixel parameter calculation unit that calculates parameter values including wavelet phase, ridge angle, and inter-ridge distance corresponding to each pixel by means of applying continuous wavelet conversion with respect to the gradient of each pixel contained in the fingerprint image; a label optimization processing unit that optimizes/converts the parameter values corresponding to each pixel to values indicating the mutual continuity with the parameter values in surrounding pixels; and a ridge image generation unit that generates the ridge image by means of converting each pixel gradient in the fingerprint image on the basis of the optimal value.

12 Claims, 9 Drawing Sheets

(56) References Cited

OTHER PUBLICATIONS

K.C. Lee et al., "Probabilistic Orientation Field Estimation for Fingerprint Enhancement and Verification", Biometrics Symposium, IEEE, pp. 41-46, Sep. 2008.

R. Reddy K. N. V. et al., "Fingerprint Enhancement using Hierarchical Markov Random Fields", Biometrics (IJCB), 2011 International Joint Conference on, IEEE, pp. 1-8, Oct. 2011.

C. Gottschlich, "Curved-Region-Based Ridge Frequency Estimation and Curved Gabor Filters for Fingerprint Image Enhancement", IEEE Transactions on Image Processing IEEE Service Center, vol. 21, No. 4, pp. 2220-2227, Apr. 2012.

Extended European Search Report mailed Mar. 1, 2016, by the European Patent Office in counterpart European Patent Application No. 13791452.9.

* cited by examiner

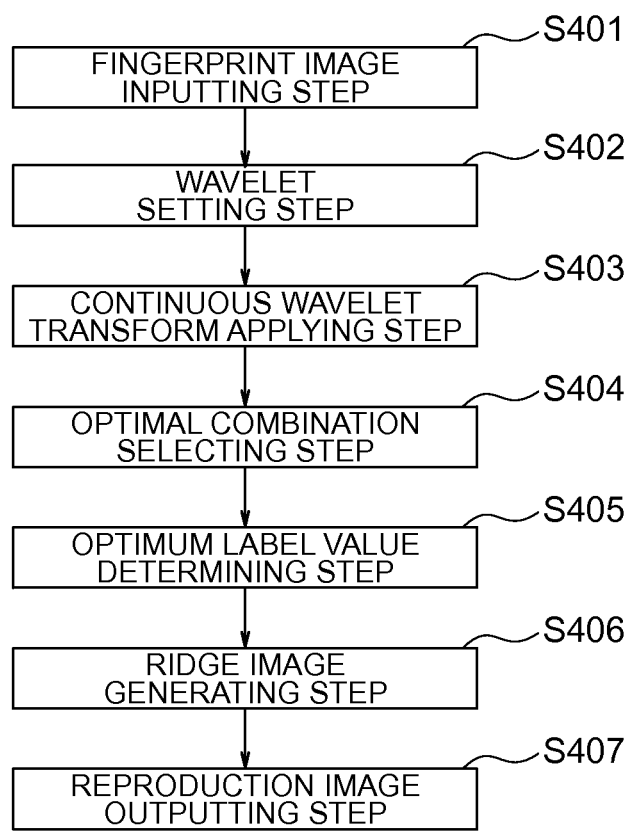

FINGERPRINT RIDGE IMAGE SYNTHESIS SYSTEM, FINGERPRINT RIDGE IMAGE SYNTHESIS METHOD, AND PROGRAM THEREOF

CROSS REFERENCE TO RELATED PATENT APPLICATIONS

This application is a National Stage Entry of International Application No. PCT/JP2013/063665, filed May 16, 2013, which claims priority from Japanese Patent Application No. 2012-114407. filed May 18, 2012. The entire contents of the above-referenced applications are expressly incorporated herein by reference.

TECHNICAL FIELD

The present invention relates to a fingerprint ridge image synthesis system which performs fingerprint matching of fingerprints based on the fingerprint ridge structures and, more specifically, relates to a fingerprint ridge image synthesis system, a fingerprint ridge image synthesis method, and a program thereof for clarifying fingerprint ridges and synthesizing fingerprint ridge images.

BACKGROUND ART

In general, a fingerprint matching system always requires a fingerprint image reproduction device which, prior to executing fingerprint matching processing, extracts fingerprint ridges from a fingerprint image as the matching target and clearly reproduces a fingerprint ridge images showing the shapes of the fingerprint ridges.

In that case, normally, when extracting the fingerprint ridges, first, a region of the fingerprint image to be the target is specified, the distances between the neighboring ridges are measured, the streaked pattern formed by the ridges is handled as a plane wave, and "Short-time Fourier Transform (referred to as "STFT" hereinafter)" or discrete wavelet transform is used thereupon to execute processing for clarifying the fingerprint ridges contained within the fingerprint image. This makes it possible in the region of low ridge quality where the ridge shape is unclear within the fingerprint image to interpolate the fingerprint ridges and to execute extraction of a minute ridge structure of smaller inter-ridge distances than a specific value, etc.

It is possible to interpolate the ridge shape regarding the part where the ridge in the fingerprint image is intermittent in a case where the ridge image is extracted by using Fourier transform on the fingerprint image. On the other hand, in a minutia such as an end point where the fingerprint ridge is intermittent or a bifurcation where the fingerprint image is branched, the ridges may be connected in some cases due to the property of Fourier transform so that the minutia may become ruined.

Further, also in a case where the ridge image is extracted by using analysis of the fingerprint image by using discrete wavelet transform, the ridge shape cannot be captured and presented accurately in a fingerprint region where a region of a minute characteristic with a small inter-ridge distance and a region with a large inter-ridge distance are mixed.

As a related technique thereof, there is known a system which executes extraction of the ridge shape by using discrete wavelet transform through performing frequency tuning for each block region set within a fingerprint image for capturing the inter-ridge distance of the minute structure within the fingerprint image (Patent Document 1).

Patent Document 1: Japanese Unexamined Patent Publication 2004-127062

However, while it is possible with the related technique disclosed in Patent Document 1 described above to acquire the distances regarding the entre ridges within the target block region, it is not possible to accurately capture the changes in the distances between the ridges in a pixel level, i.e., it is not possible to accurately capture the minute structure of the ridges in the region where the minute ridges of different inter-ridge distances are contained.

In particular, the minute structure of the ridges cannot be captured often in a case where the regions of wide inter-ridge distance (ridge pitch) and the regions of narrow inter-ridge distance exist in a mixed manner. Thus, the ridge structure is spoiled in the ridge image reproduced based on the result of such analysis.

Further, the accuracy of the fingerprint matching processing which performs the short-time Fourier transform (STFT) and the discrete wavelet transform described above depends on the extraction accuracy of the minute minutiae. Therefore, when the ridge structure is spoiled, the accuracy of the fingerprint matching becomes extremely deteriorated.

It is therefore an object of the present invention to provide a fingerprint ridge image synthesis system, a fingerprint ridge image synthesis method, and a program thereof, which can improve the shortcomings of the above-described related technique and accurately extract the ridge shapes contained in unclear fingerprint images thereby to synthesize the fingerprint image in a relatively clear manner.

DISCLOSURE OF THE INVENTION

In order to achieve the foregoing object, the fingerprint ridge image synthesis system according to the present invention is characterized as a fingerprint ridge image synthesis system which includes an image synthesis main unit which extracts ridge shapes contained in a fingerprint image and synthesizes a ridge image of the fingerprint image based thereupon, wherein the image synthesis main unit includes: a wavelet setting unit which sets different wavelet wavelength ($\lambda$) and wavelet angle ($\theta$) as parameter values of wavelets and also sets combinations thereof as parameter sets by corresponding to gradient of each pixel of the fingerprint image; a continuous wavelet transforming unit which performs continuous wavelet transform processing on partial regions within the fingerprint image corresponding to each of the pixels based on each of the different parameter sets; a ridge pixel parameter calculation unit which calculates consistency between the wavelets corresponding to each of the parameter sets and ridge shapes in each of the partial regions, and determines the parameter set of the highest consistency as the parameter set corresponding to each of the pixels; a label optimization processing unit which updates/converts the parameter values of the parameter set of each of the pixels and each of neighboring pixels neighboring to those pixels to optimal values with which mutual continuity of the parameter values becomes optimum; and a ridge image generation unit which synthesizes the ridge image by setting gray-scale values of each corresponding pixel based on the parameter sets constituted with the optimal values.

Further, in order to achieve the foregoing object, the fingerprint ridge image synthesis method according to the present invention is characterized as a fingerprint ridge image synthesis method used in a fingerprint ridge image synthesis system including an image synthesis main unit which extracts ridge shapes contained in a fingerprint image and synthesizes a ridge image of the fingerprint image based thereupon, and the method includes: setting different wavelet wavelength (λ) and wavelet angle (θ) as parameter values of wavelets and also sets combinations thereof as parameter sets by corresponding to gradient of each pixel of the fingerprint image; performing continuous wavelet transform processing on partial regions within the fingerprint image corresponding to each of the pixels based on each of the different parameter sets; calculating consistency between the wavelets corresponding to each of the parameter sets and ridge shapes in each of the partial regions, and determining the parameter set of the highest consistency as the parameter set corresponding to each of the pixels; updating the parameter values of the parameter sets of each of the pixels and each of neighboring pixels neighboring to those pixels to optimal values with which mutual continuity of the parameter values becomes optimum; and generating the ridge image by setting gray-scale values of each corresponding pixel based on the parameter sets constituted with the optimal values, wherein each of those action steps is executed successively by the image synthesis main unit.

Furthermore, in order to achieve the foregoing object, the fingerprint ridge image synthesis program according to the present invention is characterized as a fingerprint ridge image synthesis program used in a fingerprint ridge image synthesis system including an image synthesis main unit which extracts ridge shapes contained in a fingerprint image and synthesizes a ridge image of the fingerprint image based thereupon, and the program causes a computer provided to the image synthesis main unit to execute each of: a wavelet setting function which sets different wavelet wavelength (λ) and wavelet angle (θ) as parameter values of wavelets as well as combinations thereof by corresponding to gradient of each pixel of the fingerprint image; a continuous wavelet transforming function which performs continuous wavelet transform processing on partial regions within the fingerprint image corresponding to each of the pixels based on each of the different parameter sets; a ridge pixel parameter calculating function which calculates consistency between the wavelets corresponding to each of the parameter sets and ridge shapes in each of the partial regions, and determines the parameter set of the highest consistency as the parameter set corresponding to each of the pixels; a label optimization processing function which updates the parameter values of the parameter sets of each of the pixels and each of neighboring pixels neighboring to those pixels to optimal values with which mutual continuity of the parameter values becomes optimum; and a ridge image generating function which generates the ridge image by setting gray-scale values of each corresponding pixel based on the parameter sets constituted with the optimal values.

The present invention is structured in the manner described above. According to that, the present invention can provide the excellent fingerprint ridge image synthesis system, the fingerprint ridge image synthesis method, and the program thereof, which are not found in the existing related techniques and are capable of accurately extracting the ridge shapes contained in unclear fingerprint images and capable of synthesizing (reproducing) the fingerprint images in a relatively clear manner thereby through having the ridge pixel parameter calculation unit which calculates the parameter values including the inter-ridge distances corresponding to each pixel, the ridge angles, and the wavelet phases by applying continuous wavelet transform for the gradients of each pixel contained in the fingerprint images and the label optimization processing unit which performs optimizing conversion on the parameter values corresponding to each pixel to the values that show the mutual continuity with respect to the parameter values of the surrounding pixels.

BRIEF DESCRIPTION OF THE DRAWINGS

FIG. 4 is a flowchart showing the entire actions of the fingerprint ridge image synthesis system disclosed in FIG. 1;

FIGS. 5A and 5B show a part of a fingerprint image inputted to the fingerprint ridge image synthesis system disclosed in FIG. 1, in which FIG. 5A is a fragmentary enlarged view showing a partial region of the fingerprint image and FIG. 5B is an explanatory view showing an example of a ridge image that is generated based on the result acquired by performing calculations of ridge pixel parameters on FIG. 5A;

FIGS. 6A-6C show a part of another fingerprint image inputted to the fingerprint ridge image synthesis system disclosed in FIG. 1, in which FIG. 6A is an explanatory view showing a fingerprint image at the time of input, FIG. 6B is an explanatory view showing an example of a ridge image that is generated based on the result acquired by performing calculations of ridge pixel parameters on FIG. 6A, and FIG. 6C is an explanatory view showing an example of a fingerprint image that is generated based on the result acquired by performing label optimization processing on FIG. 6B;

FIGS. 7A-7C show a part of another fingerprint image inputted to the fingerprint ridge image synthesis system disclosed in FIG. 1, in which FIG. 7A is an explanatory view showing a fingerprint image at the time of input, FIG. 7B is an explanatory view showing an example of a ridge image that is generated based on the result acquired by performing calculations of ridge pixel parameters on FIG. 7A, and FIG. 7C is an explanatory view showing an example of a fingerprint image that is generated based on the result acquired by performing label optimization processing on FIG. 7B;

BEST MODES FOR CARRYING OUT THE INVENTION (Embodiment)

Next, an embodiment of the present invention will be described by referring to FIG. 1 to FIG. 9. A basic structural content of a fingerprint ridge image synthesis system according to the embodiment will be described first, and a specific content thereof will be described thereafter.

Figure 1:
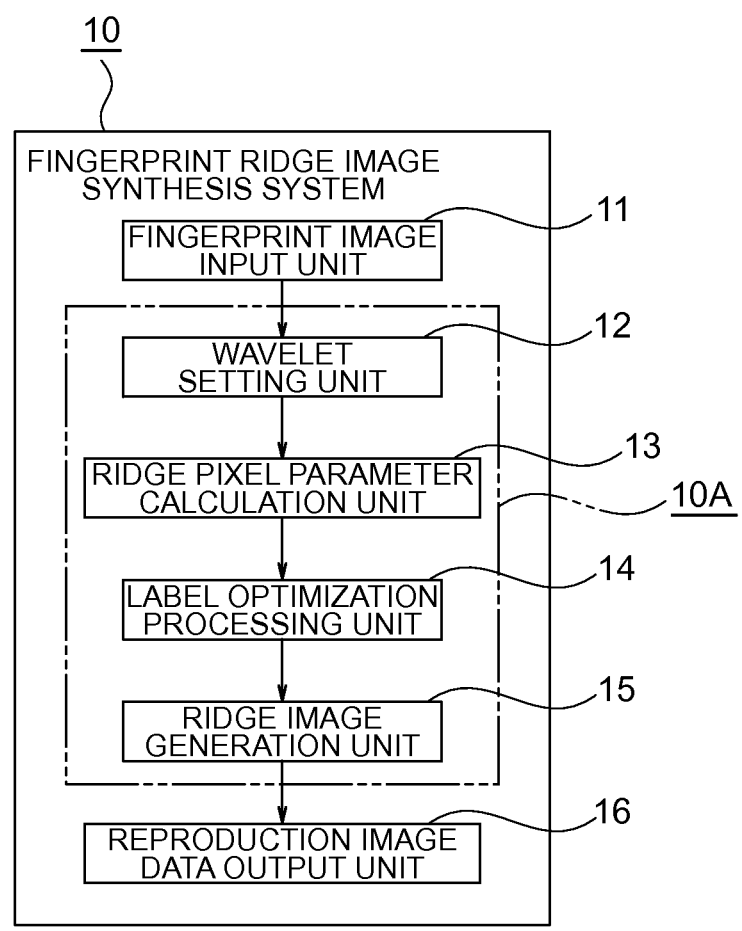
FIG. 1 is a schematic block diagram showing an embodiment of a fingerprint ridge image synthesis system according to the present invention.
Figure 2:
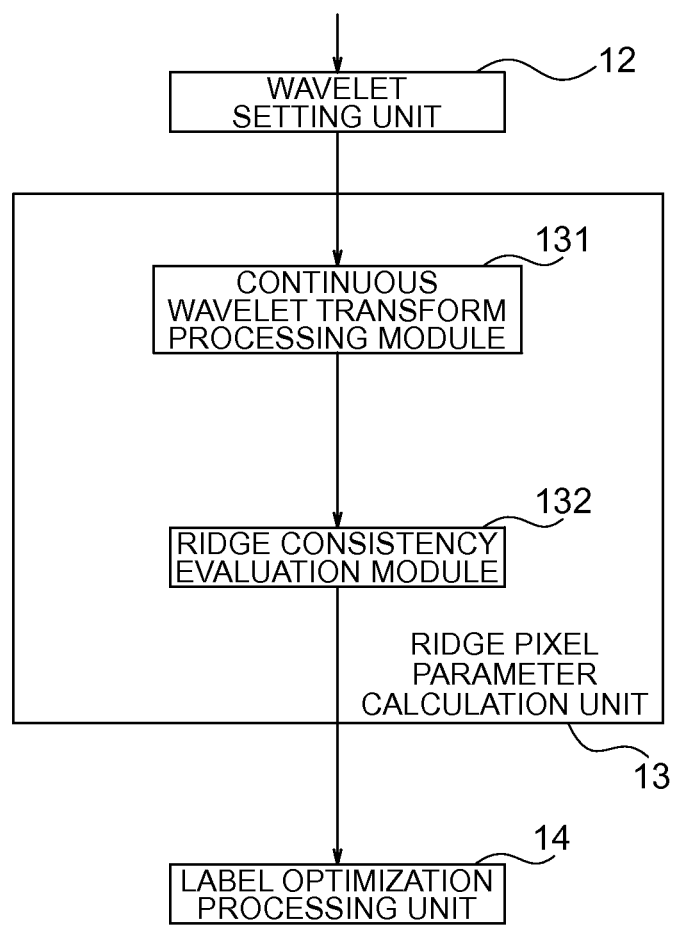
FIG. 2 is a schematic block diagram showing an example of the inside structure of a ridge pixel parameter calculation unit of the fingerprint ridge image synthesis system disclosed in FIG. 1.
Figure 3:
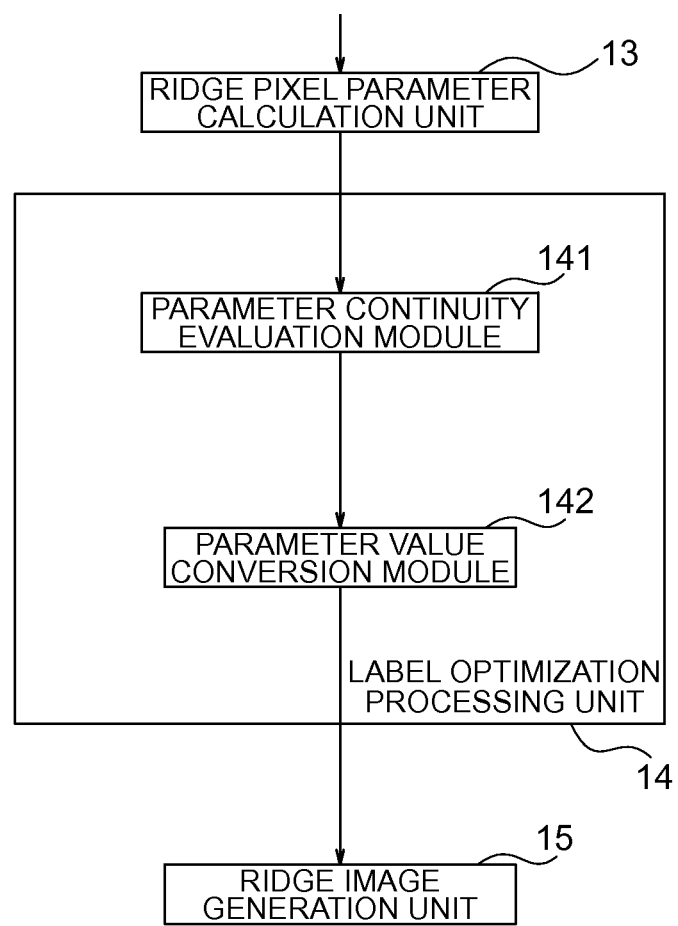
FIG. 3 is a schematic block diagram showing an example of the inside structure of a label optimization processing unit of the fingerprint ridge image synthesis system disclosed in FIG. 1.

As shown in FIG. 1, a fingerprint ridge image synthesis system 10 according to the embodiment includes: a fingerprint image input unit 11 which acquires a fingerprint image inputted from outside and stores it to a storage unit (not shown); an image synthesis main unit 10A which extracts ridge shapes contained in the fingerprint image and synthesizes a ridge image; and a ridge image data output unit 16 which outputs the ridge image synthesized by the image synthesized main unit 10A.

Note here that the image synthesis main unit 10A is constituted by including: a wavelet setting unit 12 which sets different wavelet wavelengths (λ), wavelet angles (θ) which are parameter values of wavelets, and parameter sets which are combinations thereof by corresponding to gradients of each pixel of the fingerprint image; a ridge pixel parameter calculation unit 13 including a continuous wavelet transforming function for performing continuous wavelet transform processing based on each of the different parameter sets for partial regions corresponding to each of the pixels within the fingerprint image, which calculates consistency between the wavelets corresponding to each of the parameter sets and the ridge shapes in each of the partial regions, and determines the parameter set exhibiting the consistency of highest degree as the parameter set corresponding to each of the pixels; a label optimization processing unit 14 which updates/converts the parameter values of the parameter sets of each of the pixels and each of neighboring pixels located neighboring to that pixel to optimal values as values with which the mutual continuity of the parameter values become optimum; and a ridge image generation unit 15 which synthesizes the ridge images by setting gradient values of each of corresponding pixels based on the parameter set constituted with the optimal values.

Thus, with the embodiment, the ridge pixel parameter calculation unit 13 and the label optimization processing unit 14 effectively function in the manner described later. Therefore, it is possible to accurately extract the shapes of the ridges contained in an unclear fingerprint image, so that a relatively clear fingerprint ridge image can be synthesized (reproduced) thereby.

Note here that the above-described label optimization processing unit 14 is structured by including an update value calculating function which calculates the reliability regarding the parameter values of each of the pixels described above based on the parameter values of the neighboring pixels and calculates the optimal values of each of the pixels based on a difference in the reliability calculated by corresponding to the neighboring pixels.

Further, the wavelet setting unit 12 includes a wavelet region variable setting function which variably sets the size of the partial regions as the calculation target of the consistency by setting decay distance (τ) of the wavelet as the parameter value of the wavelet.

Furthermore, the wavelet setting unit 12 includes an oval wavelet setting function which performs the continuous wavelet transform processing by applying oval wavelets constituted with different decay distances for the partial region having equal to or larger than a specific value for the curvature of ridge in the fingerprint image described above.

Hereinafter, this will be described in more details.

First, the wavelet setting unit 12 sets a plurality of different wavelets by having each of the pixels constituting the inputted fingerprint image as the targets.

Specifically, the wavelet setting unit 12 sets the parameter set constituted with the wavelength (λ) of the wavelet, the angle (θ) of the wavelet, and the distance (decay distance: referred to as "τ" hereinafter) for which the amplitude of the wavelet becomes equal to or less than a specific value by corresponding to a given pixel (referred to as target pixel) which constitutes the fingerprint image.

The wavelet setting unit 12 sets the parameter set by corresponding to all the pixels constituting the fingerprint image.

The set wavelet herein is in a circular form. Further, it is to be noted that the decay distance (life (τ)) of the wavelet shows the radius of each set wavelet.

In the embodiment, the above-described three kinds of values show different values contained within respective specific ranges. That is, the parameters can be set for a finite number of units (kinds) discretely.

Further, the wavelet setting unit 12 sets a wavelet image which corresponds to a combination of discrete values acquired by increasing/decreasing each parameter. Note here that the size of the wavelet shows the size of the region as the target for measuring the consistency within the fingerprint image corresponding to the target pixel, and it is determined by the value of τ (radius).

Note here that C showing the number of wavelets set by corresponding to each pixel is defined by (Formula 1) in the followings.

(Expression 1)

$$C = \text{(Number of kinds of radius}(\tau) \text{ of wavelets to be set)} \times \text{(Number of directions}(\theta) \text{ of wavelets to be set)} \times \text{(Number of kinds of wavelengths } (\lambda) \text{ of wavelets to be set)} \quad \text{(Formula 1)}$$

The wavelet setting unit 12 may be structured to set an oval wavelet containing different τ (e.g., τ1 and τ2) as the shape of the wavelet to be set.

This makes it possible to set the wavelet with a still higher consistency for a region where the curvature of the fingerprint ridges within the fingerprint image is high, for example, through setting the oval wavelet by having the direction of the ridge as the major axis and the direction perpendicular to the ridge direction as the minor axis in that region.

Thereby, even in the region where the curvature of the fingerprint ridges is high, it becomes possible to acquire the wavelet set with a high consistency that is same as the case of the stable region where the curvature of the fingerprint ridges is low.

The ridge pixel parameter calculation unit 13 includes a continuous wavelet transform processing module 131 (FIG. 2) which performs continuous wavelet transform processing on the fingerprint image by a pixel unit (by corresponding to each pixel), and calculates to detect which parameter set has high consistency with the ridge structure of the fingerprint pixel region having the target pixel as the center among the C pieces of the parameter sets (λ, θ, τ) set by corresponding to each pixel.

The continuous wavelet transform processing module 131 performs a convolution calculation (continuous wavelet transform processing) by using the c pieces of wavelets corresponding to each of the C pieces of parameter sets for the regions (referred to as the target-pixel regions) corresponding to each of the target pixels in the fingerprint image.

Note here that a ridge consistency evaluation module 132 of the ridge pixel parameter calculation unit 13 calculates the consistency between each of the wavelets determined by the parameter sets and the target-pixel region. The consistency shows the degree of consistency between the ridge shape of the target-pixel region and the waveform shape (wavelet shape) of the wavelet image.

Further, the ridge consistency evaluation module 132 calculates the energy value (E) that is the intensity of the response of each wavelet for the corresponding target-pixel region (i.e., the consistency of the ridge shape for the wavelet).

Through the above-described processing executed by the ridge pixel parameter calculation unit 13, a combination (parameter set) containing the ridge wavelength (λ), the angle (θ), and the waveform life (τ) of the ridge corresponding to each pixel constituting the fingerprint image can be derived.

When a part where the wavelet matches the ridge shape is contained as a result of executing the convolution calculation for the target-pixel region (e.g., region of the radius τ) by using each wavelet, the consistency (energy: E) showing the degree of consistency is calculated by corresponding to each wavelet.

The continuous wavelet transform processing module 131 variably sets the size of the wavelet, i.e., the size of the region, by using the values acquired by increasing/decreasing τ as the size of the radius of the wavelet (life of the wavelet) within a specific range.

Note here that the waveform with the short life (τ) (small wavelet) is considered to be suited for capturing the ridge shape in the image region smaller than a specific value. Thus, it is possible to extract the ridge shape within the fingerprint image when continuous wavelet transform is applied to the fingerprint region containing different inter-ridge distances, for example.

Further, when the wavelet of long waveform life (τ) is applied (i.e., a case where the applied range of wavelet transform is wide), it is highly possible that a part where the wavelength (λ) and the angle (θ) of the wavelet match is contained within the range of the applied wavelet. Thereby, it is possible to set the wavelet (label) of still higher consistency.

Note here that when more parts where the wavelet and the ridge shape are consistent are contained within the range of applied CWT (continuous wavelet transform) in the fingerprint image, it is judged that the consistency (consistency energy) between the CWT applied range and the wavelet is high in the fingerprint image.

That is, even in a case where the applied range of continuous wavelet transform is narrow so that the consistency between the wavelet and the fingerprint image is lower than the specific value (or 0), it is possible to have the ridge part consistent with the wavelet contained within the applied range through widening (setting the value of τ to be a large value herein) the applied range of continuous wavelet transform. In that case, it is possible to acquire the wavelet of high consistency (energy: E).

This makes it possible to set the wavelet with the consistency of equal to or more than the specific value even with an image region of a low fingerprint image quality in general such as a ridge region where omission of ridges and curvature are high and a region where dispersion of inter-ridge distances is high.

Figure 8:
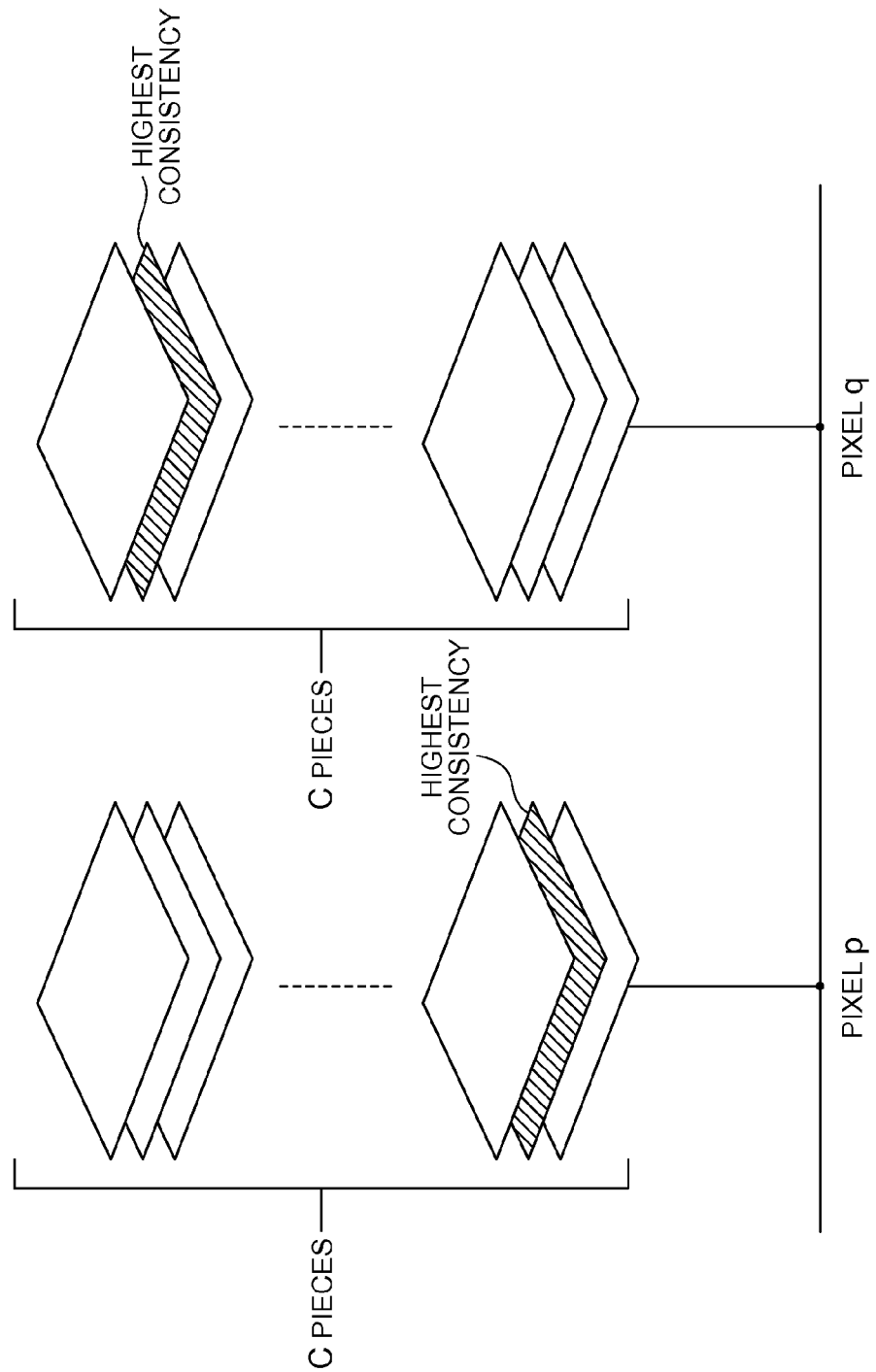
FIG. 8 is an explanatory chart showing the content of actions for selecting a wavelet set in the fingerprint ridge image synthesis system disclosed in FIG. 1.

Further, as shown in FIG. 8, the ridge consistency evaluation module 132 determines the wavelet (i.e., parameter set) of the highest consistency among the C pieces of consistencies when the consistencies between each of the C pieces of wavelets and the target-pixel regions are calculated as the parameter set corresponding to the target pixel.

Further, the ridge consistency evaluation module 132 sets the phase (φ) corresponding to each parameter set within a specific value range and thereby determines the value of the phase (φ) with which the consistency value becomes the highest.

Further, the ridge consistency evaluation module 132 considers the C pieces of parameter sets corresponding to each pixel in the ridge image as the C pieces of labels, and selects the parameter set whose degree of consistency (E: ridge consistency) with respect to the ridge structure is the highest among those labels as a consistent parameter set (a consistent parameter set determining function).

Note here that the continuous wavelet transform processing module 131 and the ridge consistency evaluation module 132 determine the label (parameter set) of the high consistency corresponding to each pixel through performing calculation processing based on Formulae 2 to 5.

(Expression 2)

$$\psi^*(T) = \exp(-mITI^2 + i2\pi Tx) \quad \text{(Formula 2)}$$
$$= \exp\left\{\begin{array}{l}-ma^{-2}[(x-bx)^2 + (y-by)^2] + \\ i2\pi a^{-1}[(bx-x)\cos\theta + (by-y)\sin\theta]\end{array}\right\}$$
$$= \zeta(b-x)$$

$$\zeta(x) = \exp[-ma^{-2}(x^2 + y^2) + i2\pi a^{-1}(x\cos\theta + y\sin\theta)] \quad \text{(Formula 3)}$$

wherein (Formula 4)

$$m = \frac{1}{2\tau^2}$$

$$a = \frac{\left(W_0 + \sqrt{2 + W_0^2}\right)\lambda}{4\pi}$$

($W_0$ is constant)

$$W(b, a, \theta) = a^{-n}\int_{-\infty}^{\infty} I(x) \cdot \psi^*(T) d^2x$$
$$= a^{-n}\int_{-\infty}^{\infty} I(x) \cdot \zeta(b-x) d^2x$$

$$\phi(b) = \phi = \tan^{-1}\left(\frac{\text{Im}W(b, a, \theta)}{\text{Re}W(b, a, \theta) - I_0(\pi/m)\exp(-\pi^2/m)}\right) \quad \text{(Formula 5)}$$

Note here that W in Formula 4 is calculated as a complex number. Further, Im and Re in Formula 5 shows the imaginary part and the real part of the complex number W, respectively. Furthermore, thick letter b in Formulae 2 to 5 shows the position of the pixel in the image (i.e., coordinate value), and I(x) in Formula 4 shows the value of each pixel in the starting image.

In the region within the fingerprint image where the ridges are expressed uniformly clearly, normally, when the ridge consistency evaluation module 132 selects the parameter set (combination) of each pixel with which E becomes the highest as the combination value (consistent parameter set), it is possible to transform the fingerprint image to a ridge image of fine visibility by using the parameter set.

Figure 5A:
Figure 5B:
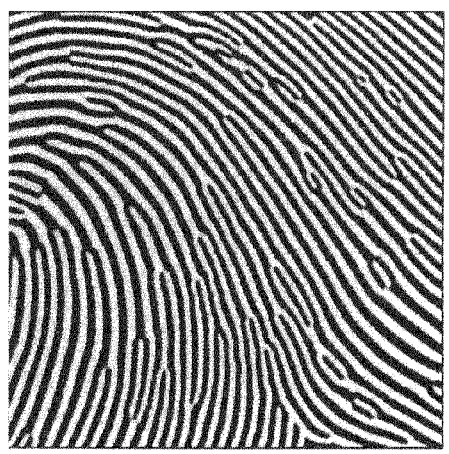
Figure 6A:
Figure 6B:
Figure 6C:
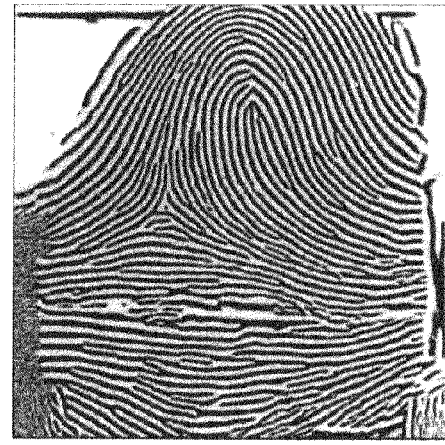
Figure 7A:
Figure 7B:
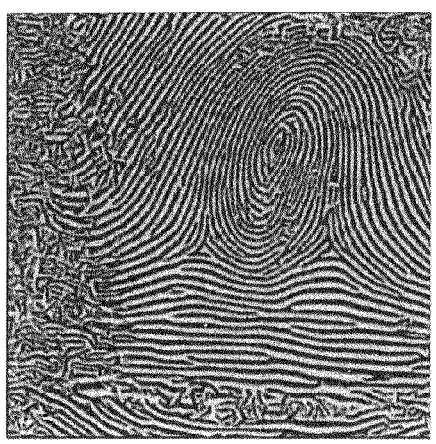
Figure 7C:
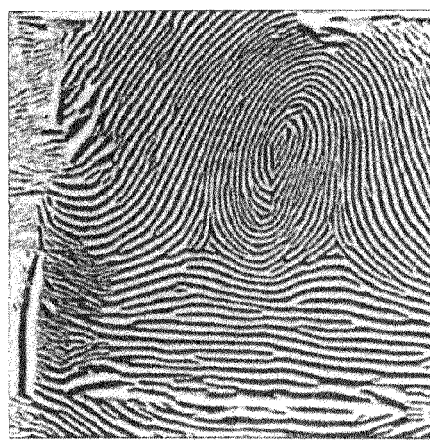

For example, FIG. 5B shows an example of the ridge image generated based on the consistent parameter sets of each of the pixels through applying the optimal parameter set selecting function on the region of the fingerprint image where the ridges are shown uniformly clearly as shown in FIG. 5A.

In the image shown in FIG. 5B, the parameter set (combination) with which the ridge consistency (E) becomes high is selected as the consistent parameter set as described above. Thus, it shows that the ridge image of fine ridge visibility is effectively extracted from the fingerprint image.

In the region whose fingerprint quality is lower than a specific value contained in an actual fingerprint image, it is necessary to evaluate whether or not there is inconsistency in the continuity of different parameter sets by comparing the target pixel with the parameter sets corresponding to each of the pixels (surrounding pixels) in the surrounding regions.

Further, there is a case where the parameter sets corresponding to each of the pixels calculated by the ridge pixel parameter calculation unit 13 may not be the best parameter values required for generating the ridge image. Thus, in the embodiment, processing for updating the calculated parameter set by using CWT is executed by using the belief propagation method as shown in the followings.

This makes it possible to calculate the parameter set for extracting the ridge image accurately from the fingerprint image.

The label optimization processing unit 14 includes a parameter continuity evaluation module 141 (FIG. 3) which acquires the parameter values of the neighboring pixels (four neighboring pixels vertically and laterally) by corresponding to each pixel. The parameter continuity evaluation module 141 stores the label for the vertically and laterally neighboring pixels by corresponding to each pixel while taking the parameter set (label) determined by corresponding to each pixel regarding the target pixel and the surrounding pixels as the initial value.

Further, the label optimization processing unit 14 includes a parameter value conversion module 142 (FIG. 3) which converts the calculated values of the parameter sets corresponding to each pixel so that the differences of the parameter sets ($\lambda$, $\theta$, $\tau$) between the neighboring pixels change continuously (i.e., the continuity can be maintained).

Note here that the parameter value conversion module 142 compares the parameter sets of the target pixel and the surrounding pixels, and determines the parameter set (referred to as "optimum label value") corresponding to each pixel where continuous fluctuation in the pitch between the pixels in the entire image, angle, and the phase is maintained.

Thereby, the parameter value conversion module 142 updates the values to the values with which the continuity (connection property) can be maintained so that the difference between the values of the parameter sets corresponding to each of the neighboring pixels is suppressed within a specific value.

The fingerprint image normally exhibits such a characteristic that the parameter sets $\lambda$ (wavelength), $\theta$ (angle), $\phi$ (phase)) of each of different pixels in the image continuously and smoothly change between the neighboring pixels.

Thus, in the embodiment, the parameter value conversion module 142 performs processing for converting the label values of the parameter sets corresponding to each pixel to the label values exhibiting the connecting property (no discontinuity) between the neighboring pixels by using the belief propagation method.

The parameter value conversion module 142 specifically performs conversion of the label values of each pixel such that the cost function E(f) becomes 0 (or approximated to 0 as much as possible) as the entire image through performing the processing based on following functions (Formula 6 and Formula 7).

(Expression 3)

$$E(f) = \sum_{p \in P} Dp(fp) + \sum W(fp, fq)$$  (Formula 6)

Dp(fp) shows a value (penalty value) showing a difference between a reference value and a value acquired by adding another label value to a label value (reference value) set by corresponding to the target pixel, and W(fp, fq, fr) shows a difference value of a probability value (fp, fq, fr) sent from three neighboring pixels (p, q, r).

Here, the parameter value update action content by the belief propagation method will be described by referring to the explanatory chart shown in FIG. 9.

By corresponding to the target pixel, the label optimization processing unit 14 updates the label value of the target pixel based on the probability value that is calculated based on the label values of the neighboring pixels.

Figure 9:
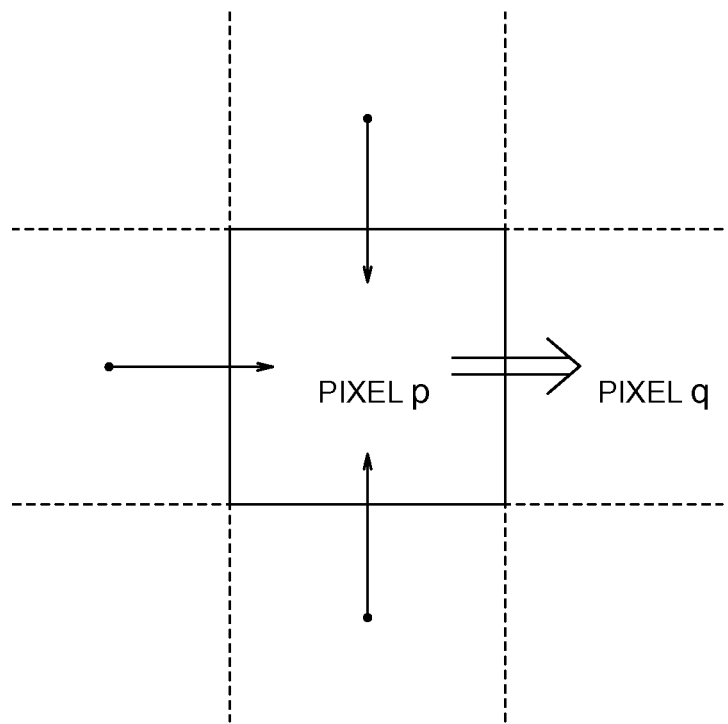
FIG. 9 is an explanatory chart showing an image of message propagation performed between each of the pixels in the fingerprint ridge image synthesis system disclosed in FIG. 1 by using a belief propagation method.

At this time, based on the content of the message containing the probability values propagated from the three neighboring pixels as shown in FIG. 9, the label optimization processing unit 14 calculates the probability value showing the likelihood of the parameter value of the remaining one neighboring pixel, and informs the probability value (referred to as label value confident degree) to the remaining one neighboring pixel as a message.

The processing for calculating, informing, and storing the label value confident degree is all executed by the parameter value conversion module 142.

The parameter value conversion module 142 performs calculation of the label value confident degree (m) contained in the massage based on the function shown in (Formula 7) below.

(Expression 4)

$$m_{p \rightarrow q}^{t}(fq) = \min_{fp}\left( V(fp - fq) + Dp(fp) + \sum_{s \in N(p) \backslash q} m_{s \rightarrow p}^{t-1}(fp) \right)$$  (Formula 7)

Note here that m in (Formula 7) shows the probability value calculated based on the message content informed from the neighboring pixels of each pixel. Further, Dp and V in (Formula 7) correspond to Dp and W in (Formula 6) mentioned above, respectively.

The label optimization processing unit 14 calculates each label value confident degree of each pixels based on the label value confident degree informed from the corresponding neighboring pixel, and updates to the label value with the highest continuity between the label value corresponding to each pixel (target pixel) and the label value (neighboring label value) of the neighboring pixel.

The label optimization processing unit 14 may be set to calculate the penalty value (e.g., when the changing rate between the label values is high, the penalty value becomes still higher) showing the discontinuity with respect to the neighboring label value by corresponding to each label value confident degree.

Thereby, each label value (neighboring label value) corresponding to each pixel is updated to the label value with the highest continuity in the entire image through updating each label value in such a manner that the penalty value becomes the minimum value (ideally 0).

Further, notification of the message containing the probability value is executed by the parameter continuity evaluation module 141 all at once for each of the neighboring pixels in the entire pixels constituting the fingerprint image. Each message notification executed all at once is taken as one generation and defined as the value of t in (Formula 7) mentioned above. That is, the value of t shows the number of message notifications executed all at once in the entire fingerprint image.

The parameter value conversion module 142 updates the label value based on the probability value in the message informed by corresponding to each pixel, and calculates the label value of each pixel with which the value of m in (Formula 7) becomes the minimum as the final output value.

Thereby, the label value is updated based on the informed message while expanding (propagating) the referring range for calculating the optimal value from the local region including the surrounding pixels of the target pixel to the wider region of the surroundings thereof and further to the entire fingerprint image regarding each of the entire pixels of the fingerprint image. Therefore, the label value determined at last can be the value showing the optimal value of the continuity (connecting property) in the label values between each of the pixels.

Specifically, the parameter value conversion module 142 performs calculation of the optimum label value by using the belief propagation method (BP).

Thereby, the parameter optimization processing unit 14 determines the continuous parameter set values having no inconsistency in the continuity between each of the pixels in the entire image regions.

The ridge image generation unit 15 generates the ridge image through performing processing for determining the gray-scale values of each of the corresponding pixels based on the calculation result of the optimum label values (parameter sets). Thereby, the ridge image can be synthesized in which the shapes of the fingerprint ridges are extracted from the fingerprint image.

Further, the ridge image generation unit 15 may be set to synthesize the ridge image by converting the gradients of each of the pixels of the fingerprint image.

As described above, the fingerprint ridge image synthesis system 10 as the embodiment can extract the ridge shapes accurately even from the fingerprint image in which the narrow inter-ridge distance part and the wide inter-ridge distance part exist in a mixed manner and, further, can synthesize the ridge image in which the ridge shapes within the fingerprint image are extracted accurately by effectively interpolating the ridge in the region where the ridge is unclear through executing the processing in which the continuous wavelet transform (CWT) and the belief propagation method (BP) are combined on the parameter values of each of the pixels in the fingerprint image.

(Explanations Regarding Actions of Embodiment)

Next, actions of the embodiment will be described.

Basic procedures of the actions will be described first and, thereafter, specific actions will be described in order.

First, the wavelet setting unit 12 of the image synthesis main unit 10A sets the different wavelet wavelength (λ) and wavelet angle (θ) as the parameter values of the wavelets and the parameter sets as the combination thereof by corresponding to the gradients of each of the pixels of the fingerprint image described above (a parameter set setting step).

Subsequently, the ridge pixel parameter calculation unit 13 performs the continuous wavelet transform processing on the partial regions within the fingerprint image corresponding to each of the pixels based on each of the different parameter sets, calculates the consistency between the wavelets corresponding to each of the parameter sets and the ridge shapes in each of the partial regions, and determines the parameter set of the highest consistency as the parameter set corresponding to each of the pixels (a ridge pixel parameter calculating step).

Then, the label optimization processing unit 14 updates/converts the parameter values of the parameter sets of each of the pixels and each of the neighboring pixels neighboring to those pixels to the optimization values as the values with which the mutual continuity of the parameter value becomes the optimum (a label optimization determining step).

Subsequently, the ridge image generation unit 15 functions based on the parameter sets constituted with the optimal values to set the gray-scale values of each of the corresponding pixels for generating the ridge image (a ridge image synthesizing step).

Note here that the action contents of each of the action steps including each action step to be described later may be put into a program to be executed by a computer that is provided to the image synthesis main unit 10A.

Next, the specific action content of the ridge image synthesis system 10 of the embodiment will be described by referring to a flowchart of FIG. 4, FIGS. 6A to 6C, and FIGS. 7A to 7C.

First, the wavelet setting unit 12 sets a plurality of different wavelets (FIG. 4: step S402) by having each pixel constituting the inputted fingerprint image (FIG. 4: step S401) as the target.

Note here that C showing the number of wavelets to be set by corresponding to each pixel is defined by (Formula 1) below.

(Expression 1)

$$C = \text{(Number of kinds of radius}(\tau) \text{ of wavelets to be set)} \times \text{(Number of directions}(\theta) \text{ of wavelets to be set)} \times \text{(Number of kinds of wavelengths } (\lambda) \text{ of wavelets to be set)} \quad \text{(Formula 1)}$$

Then, the continuous wavelet transform processing nodule 131 performs the continuous wavelet transform processing on the fingerprint image by a pixel unit (by corresponding to each pixel). Note here that the continuous wavelet transform processing module 131 performs a convolution calculation using the C pieces of wavelets corresponding to each of the C pieces of parameter sets for the regions corresponding to each of the target pixels (referred to as the target-pixel regions) in the fingerprint image (FIG. 4: step S403/a continuous wavelet transform applying step).

Then, the ridge consistency evaluation module 132 calculates the consistency between each of the wavelets determined by the parameter sets and the target-pixel regions. The consistency shows the matching degree between the ridge shape of the target-pixel region and the waveform shape (wavelet shape) of the wavelet image.

Note here that the ridge consistency evaluation module 132 determines the wavelet (i.e., parameter set) acquiring the highest consistency among the C pieces of consistencies (result images) as the parameter set corresponding to the target pixel when the consistencies between each of the C pieces of wavelets and the target-pixel regions are calculated as shown in FIG. 8.

Further, the ridge consistency evaluation module 132 sets the phase (φ) corresponding to each parameter set within a specific value range and thereby determines the value of the phase (φ) with which the consistency value becomes the highest.

Further, the ridge consistency evaluation module 132 considers the C pieces of parameter sets corresponding to each pixel in the ridge image as the C pieces of labels, and selects the parameter set whose degree of consistency (E: ridge consistency) with respect to the ridge structure is the highest among those labels as a consistent parameter set (FIG. 4: step S404/an optimization combination selecting step).

Then, the parameter continuity evaluation module 141 acquires the parameter values of the consistent parameter set of the neighboring pixels (four neighboring pixels vertically and laterally) by corresponding to each pixel.

At this time, the parameter continuity evaluation module 141 stores the vertically and laterally neighboring pixels by corresponding to each pixel while taking the parameter set (label) determined by corresponding to each pixel regarding the target pixel and the surrounding pixels as the initial value.

Further, the parameter value conversion module 142 compares the parameter sets of the target pixel and the surrounding pixels, and determines the parameter set (referred to as "optimum label value) corresponding to each pixel where continuous fluctuation in the pitch between the pixels in the entire image, angle, and the phase is maintained.

The label optimization processing unit 14 convers the calculated values of the parameter sets corresponding to each of the pixels such that the differences in the parameter sets $\lambda$, $\theta$, $\phi$) change continuously between the neighboring pixels (i.e., such that the continuity can be maintained).

Thereby, the parameter value conversion module 142 updates the values of the parameter sets to the values with which the continuity (connection property) can be maintained so that the difference between the values of the parameter sets corresponding to each of the neighboring pixels is suppressed within a specific value.

The parameter value conversion module 142 specifically performs conversion of the label values of each pixel such that the cost function E(f) becomes 0 (or approximated to 0 as much as possible) as the entire image through performing the processing based on a following functions by using the belief propagation method (Formula 6 and Formula 7).

Here, the content of parameter value updating actions done by the belief propagation method (FIG. 4: step S405/an optimization label value determining step) will be described by referring to an explanatory chart shown in FIG. 9.

By corresponding to the target pixel, the label optimization processing unit 14 updates the label value of the target pixel based on the probability value that is calculated based on the label values of the neighboring pixels.

At this time, based on the content of the message containing the probability values propagated from the three neighboring pixels as shown in FIG. 9, the label optimization processing unit 14 calculates the probability value showing the likelihood of the parameter value of the remaining one neighboring pixel, and informs the probability value (referred to as label value confident degree) to the remaining one neighboring pixel as a message.

The processing for calculating, informing, and storing the label value confident degree is all executed by the parameter value conversion module 142.

The parameter value conversion module 142 performs calculation of the label value confident degree (m) contained in the massage based on the function shown in (Formula 7) below.

Note here that m in (Formula 7) shows the probability value calculated based on the message content informed from the neighboring pixels of each pixel. Further, Dp corresponds to Dp in (Formula 6) mentioned above and V corresponds to W in (Formula 6), respectively.

Further, notification of the message containing the probability value is executed by the parameter continuity evaluation module 141 all at once for each of the neighboring pixels in the entire pixel constituting the fingerprint image. Each message notification executed all at once is taken as one generation and defined as the value of t in (Formula 7) mentioned above. That is, the value of t shows the number of message notifications executed all at once in the entire fingerprint image.

The parameter value conversion module 142 updates the label value based on the probability value in the message informed by corresponding to each pixel, and calculates the label value of each pixel with which the value of m in Formula 7 becomes the minimum as the final output value.

Thereby, the label value is updated based on the informed message while expanding (propagating) the referring range for calculating the optimal value from the local region including the surrounding pixels of the target pixel to the wider region of the surroundings thereof and further to the entire fingerprint image regarding each of the entire pixels of the fingerprint image. Therefore, the label value determined at last can be the value showing the optimal value of the continuity (connecting property) in the label values between each of the pixels.

Specifically, the parameter value conversion module 142 performs calculation of the optimum label value by using the belief propagation method (BP).

Thereby, the parameter optimization processing unit 14 determines the continuous parameter set values having no inconsistency in the continuity between each of the pixels in the entire image regions.

The ridge image generation unit 15 generates the ridge image through performing processing for determining the gray-scale values of each of the corresponding pixels based on the calculation result of the optimum label values (parameter sets). Thereby, the ridge image can be synthesized in which the shapes of the fingerprint ridges are extracted from the fingerprint image (FIG. 4: step S406/a ridge image generating step). Further, the ridge image generation unit 15 may be set to synthesize the ridge image by converting the gradients of each of the pixels of the fingerprint image.

As described above, the fingerprint ridge image synthesis system 10 shown in the embodiment can extract the ridge shapes (ridge structure) accurately even in the fingerprint region in the vicinity of the minutiae, in the minute structural region with a small inter-ridge distance, and the fingerprint region where the narrow inter-ridge distance part and the wide inter-ridge distance part exist in a mixed manner and, further, can synthesize the ridge image from which the minutiae contained within the fingerprint image can be detected effectively by effectively interpolating the ridge omitted part that cannot be interpolated when normal Fourier transform and discrete wavelet transform are employed.

The new technical content of the above-described embodiment can be summarized as follows. While a part of or a whole part of the embodiment described above can be summarized as follows as the new technique, the present invention is not necessarily limited to those.

(Supplementary Note 1)

A fingerprint ridge image synthesis system which includes an image synthesis main unit which extracts ridge shapes contained in a fingerprint image and synthesizes a ridge image of the fingerprint image based thereupon, wherein the image synthesis main unit includes:

a wavelet setting unit which sets different wavelet wavelength ($\lambda$) and wavelet angle ($\theta$) as parameter values of wavelets and also sets combinations thereof as parameter sets by corresponding to gradient of each pixel of the fingerprint image;

a ridge pixel parameter calculation unit which includes a continuous wavelet transforming function for performing continuous wavelet transform processing on partial regions within the fingerprint image corresponding to each of the pixels based on each of the different parameter sets, calculates consistency between the wavelets corresponding to each of the parameter sets and ridge shapes in each of the partial regions, and determines the parameter set of the highest consistency as the parameter set corresponding to each of the pixels;

a label optimization processing unit which updates/converts the parameter values of the parameter sets of each of the pixels and each of neighboring pixels neighboring to those pixels to optimal values with which mutual continuity of the parameter values becomes optimum; and a ridge image generation unit which synthesizes the ridge image by setting gray-scale values of each corresponding pixel based on the parameter sets constituted with the optimal values.

(Supplementary Note 2)

The fingerprint ridge image synthesis system as depicted in Supplementary Note 1, wherein the label optimization processing unit includes an update value calculating function which calculates reliability of the parameter values of each of the pixels based on the parameter values of the neighboring pixels, and calculates optimization values of each of the pixels based on a difference in the reliability calculated by corresponding to the neighboring pixels.

(Supplementary Note 3)

The fingerprint ridge image synthesis system as depicted in Supplementary Note 1, wherein the wavelet setting unit includes a wavelet region variable setting function which variably sets size of partial regions as calculation targets of the consistency by setting decay distance ($\tau$) of the wavelets as the parameter value of the wavelet.

(Supplementary Note 4)

The fingerprint ridge image synthesis system as depicted in Supplementary Note 1, wherein the wavelet setting unit includes an oval wavelet setting function which performs the continuous wavelet transform processing by applying oval wavelets constituted with different decay distances for the partial region in which curvature of the ridge in the fingerprint image is equal to or more than a specific value.

(Supplementary Note 5)

A fingerprint ridge image synthesis method used in a fingerprint image synthesis system including an image synthesis main unit which extracts ridge shapes contained in a fingerprint image and synthesizes a ridge image of the fingerprint image based thereupon, and the method includes:

setting different wavelet wavelength ($\lambda$) and wavelet angle ($\theta$) as parameter values of wavelets and also sets combinations thereof as parameter sets by corresponding to gradient of each pixel of the fingerprint image;

performing continuous wavelet transform processing on partial regions within the fingerprint image corresponding to each of the pixels based on each of the different parameter sets;

calculating consistency between the wavelets corresponding to each of the parameter sets and ridge shapes in each of the partial regions, and determining the parameter set of the highest consistency as the parameter set corresponding to each of the pixels;

updating the parameter values of each of the pixels and each of neighboring pixels neighboring to those pixels to optimal values with which mutual continuity of the parameter values becomes optimum; and generating the ridge image by setting gray-scale values of each corresponding pixel based on the parameter sets constituted with the optimal values, wherein each of those action steps is executed successively by the image synthesis main unit.

(Supplementary Note 6)

A fingerprint ridge image synthesis program used in a fingerprint image synthesis system including an image synthesis main unit which extracts ridge shapes contained in a fingerprint image and synthesizes a ridge image of the fingerprint image based thereupon, and the program causes a computer provided to the image synthesis main unit to execute each of:

a wavelet setting function which sets different wavelet wavelength ($\lambda$) and wavelet angle ($\theta$) as parameter values of wavelets and also sets combinations thereof as parameter sets by corresponding to gradient of each pixel of the fingerprint image;

a continuous wavelet transforming function which performs continuous wavelet transform processing on partial regions within the fingerprint image corresponding to each of the pixels based on each of the different parameter sets;

a ridge pixel parameter calculating function which calculates consistency between the wavelets corresponding to each of the parameter sets and ridge shapes in each of the partial regions, and determines the parameter set of the highest consistency as the parameter set corresponding to each of the pixels;

a label optimization processing function which updates the parameter values of the parameter sets of each of the pixels and each of neighboring pixels neighboring to those pixels to optimal values with which mutual continuity of the parameter values becomes optimum; and a ridge image generating function which generates the ridge image by setting gray-scale values of each corresponding pixel based on the parameter sets constituted with the optimal values.

This Application claims the Priority right based on Japanese Patent Application No. 2012-114407 filed on May 18, 2012 and the disclosure thereof is hereby incorporated by reference in its entirety.

INDUSTRIAL APPLICABILITY

The present invention can be effectively applied to a fingerprint matching device which performs fingerprint matching by having a fingerprint image containing unclear fingerprint image region such as a latent fingerprint image as the target.

REFERENCE NUMERALS

10 Fingerprint ridge image synthesis system
10A Image synthesis main unit
11 Fingerprint image input unit
12 Wavelet setting unit
13 Ridge pixel parameter calculation unit
14 Label optimization processing unit
15 Ridge image generation unit
131 Continuous wavelet transform processing module
132 Ridge consistency evaluation module
141 Parameter continuity evaluation module
142 Parameter value conversion module

The invention claimed is:

1. A fingerprint ridge image synthesis system, comprising:
a memory storing instructions;
one or more processors configured to execute the instructions to:

set different wavelet wavelength (λ) and wavelet angle (θ) as parameter values of wavelets and set combinations of the wavelet wavelength and wavelet angle as parameter sets by corresponding to gradient of each pixel of the fingerprint image;

perform continuous wavelet transform processing on partial regions within the fingerprint image corresponding to each of the pixels based on each of the different parameter sets, calculate consistency between the wavelets corresponding to each of the parameter sets and ridge shapes in each of the partial regions, and determine the parameter set of the highest consistency as the parameter set corresponding to each of the pixels;

update the parameter values of the parameter sets of each of the pixels and each of neighboring pixels neighboring to those pixels to optimal values with which mutual continuity of the parameter values becomes optimum; and synthesize the ridge image by setting gray-scale values of each corresponding pixel based on the parameter sets constituted with the optimal values.

2. The fingerprint ridge image synthesis system according to claim 1, wherein the one or more processors are further configured to execute the instructions to:

calculate reliability of the parameter values of each of the pixels based on the parameter values of the neighboring pixels, and calculate optimization values of each of the pixels based on a difference in the reliability calculated by corresponding to the neighboring pixels.

3. The fingerprint ridge image synthesis system according to claim 1, wherein the one or more processors are further configured to execute the instructions to:

variably set sizes of partial regions as calculation targets of the consistency by setting decay distance (τ) of the wavelets as the parameter value of the wavelet.

4. The fingerprint ridge image synthesis system according to claim 1, wherein the one or more processors are further configured to execute the instructions to:

perform the continuous wavelet transform processing by applying oval wavelets constituted with different decay distances for the partial region in which curvature of the ridge in the fingerprint image is equal to or more than a specific value.

5. A fingerprint ridge image synthesis method used in a fingerprint ridge image synthesis system including one or more processors, the method being performed by the one or more processors and comprising:

setting different wavelet wavelength (λ) and wavelet angle (θ) as parameter values of wavelets and setting combinations of the wavelet wavelength and wavelet angle as parameter sets by corresponding to gradient of each pixel of the fingerprint image;

performing continuous wavelet transform processing on partial regions within the fingerprint image corresponding to each of the pixels based on each of the different parameter sets;

calculating consistency between the wavelets corresponding to each of the parameter sets and ridge shapes in each of the partial regions, and determining the parameter set of the highest consistency as the parameter set corresponding to each of the pixels;

updating the parameter values of the parameter sets of each of the pixels and each of neighboring pixels neighboring to those pixels to optimal values with which mutual continuity of the parameter values becomes optimum; and generating the ridge image by setting gray-scale values of each corresponding pixel based on the parameter sets constituted with the optimal values, wherein each of those action steps is executed successively by the one or more processors.

6. A non-transitory computer readable recording medium storing instructions for fingerprint ridge image synthesis the instructions causing one or more processors to execute each of:

a wavelet setting function which sets different wavelet wavelength (λ) and wavelet angle (θ) as parameter values of wavelets and setting combinations of the wavelet wavelength and wavelet angle as parameter sets by corresponding to gradient of each pixel of the fingerprint image;

a continuous wavelet transforming function which performs continuous wavelet transform processing on partial regions within the fingerprint image corresponding to each of the pixels based on each of the different parameter sets;

a ridge pixel parameter calculating function which calculates consistency between the wavelets corresponding to each of the parameter sets and ridge shapes in each of the partial regions, and determines the parameter set of the highest consistency as the parameter set corresponding to each of the pixels;

a label optimization processing function which updates the parameter values of the parameter sets of each of the pixels and each of neighboring pixels neighboring to those pixels to optimal values with which mutual continuity of the parameter values becomes optimum; and a ridge image generating function which generates the ridge image by setting gray-scale values of each corresponding pixel based on the parameter sets constituted with the optimal values.

7. The fingerprint ridge image synthesis method according to claim 5, wherein updating the parameter values of the parameter sets of each of the pixels and each of the neighboring pixels to optimal values with which mutual continuity of the parameter values becomes optimum further comprises:

calculating reliability of the parameter values of each of the pixels based on the parameter values of the neighboring pixels; and calculating optimization values of each of the pixels based on a difference in the reliability calculated by corresponding to the neighboring pixels.

8. The fingerprint ridge image synthesis method according to claim 5, wherein calculating the consistency between the wavelets corresponding to each of the parameter sets and ridge shapes in each of the partial regions further comprises:

setting sizes of partial regions as calculation targets of the consistency by setting decay distance (τ) of the wavelets as the parameter value of the wavelet.

9. The fingerprint ridge image synthesis method according to claim 5, wherein performing the continuous wavelet transform processing on the partial regions within the fingerprint image corresponding to each of the pixels based on each of the different parameter sets further comprises:

applying oval wavelets constituted with different decay distances for the partial region in which curvature of the ridge in the fingerprint image is equal to or more than a specific value.

10. The non-transitory computer readable recording medium according to claim 6, wherein the instructions cause the one or more processors to further execute:

an update value calculating function which calculates reliability of the parameter values of each of the pixels based on the parameter values of the neighboring pixels, and calculates optimization values of each of the pixels based on a difference in the reliability calculated by corresponding to the neighboring pixels.

11. The non-transitory computer readable recording medium according to claim 6, wherein the instructions cause the one or more processors to further execute:

a wavelet region variable setting function which variably sets sizes of partial regions as calculation targets of the consistency by setting decay distance ($\tau$) of the wavelets as the parameter value of the wavelet.

12. The non-transitory computer readable recording medium according to claim 6, wherein the instructions cause the one or more processors to further execute:

an oval wavelet setting function which performs the continuous wavelet transform processing by applying oval wavelets constituted with different decay distances for the partial region in which curvature of the ridge in the fingerprint image is equal to or more than a specific value.

* * * * *